Nov. 8, 1960  G. M. McGUCKIN  2,958,949
SYSTEM FOR MEASURING THE USE OF A PHONOGRAPH NEEDLE
Filed Sept. 8, 1958

INVENTOR.
GLENN M. McGUCKIN
BY *Jerry J Dunlap*
ATTORNEY

United States Patent Office 2,958,949
Patented Nov. 8, 1960

2,958,949
SYSTEM FOR MEASURING THE USE OF A PHONOGRAPH NEEDLE

Glenn M. McGuckin, 1304 Ann Arbor, Norman, Okla.

Filed Sept. 8, 1958, Ser. No. 759,763

6 Claims. (Cl. 33—125)

This invention relates generally to an improved system for measuring the use of a phonograph needle, and more particularly, but not by way of limitation, to an improved system for measuring the distance a phonograph needle travels through the grooves of phonograph records.

With the advent of higher fidelity phonographic equipment, phonograph records become more and more expensive. Substantial care must be taken that a high fidelity phonograph record is not played by using a dull or damaged needle, in order to prevent irreparable damage to the record. At the present time, the only known method for even estimating the useful life of a phonograph needle, other than by observing a change in tone quality when using the needle, is by measuring the number of hours a needle has been used. However, since a record is turned at a uniform speed, the distance per unit of time traveled by a needle through the groove of a record will be decreased as the needle approaches the center portion of the record. Also, a needle will ordinarily be used on a variety of sizes of records played at different speeds. Therefore, the time a phonograph needle is in use is not a faithful representation of the distance the needle has traveled through the grooves of phonograph records, and it will be apparent that the amount of wear of a needle will be controlled by the distance the needle has traveled, rather than the length of time the needle has been used.

The present invention contemplates a system for measuring and recording the distance a phonograph needle travels through the groove of a record, such that the total distance a needle has traveled through the grooves of a series of phonograph records played by the needle may be determined to indicate when the needle should be replaced. More specifically, the present invention contemplates the production of a current which is proportional to both the speed of rotation of a phonograph record and to the position of the needle with respect to the record, and a recording device energized by such proportional current to record the distance the needle travels through the groove of the record. In a preferred embodiment, the present invention contemplates the use of a variable inductance transformer having one coil thereof connected to the needle carrying arm of a phonograph and having the primary of the transformer energized by the current used for driving the turntable of the phonograph, such that the current induced in the secondary of the transformer is proportional both to the current used for driving the turntable and the relative position of the needle carrying arm; therefore, a recording device driven by such proportional current will provide a measurement which is proportional to the actual distance the needle travels through the groove of the record being played by the phonograph.

An important object of this invention is to minimize the needle damage to phonograph records.

Another object of this invention is to provide a realistic measurement of the useful life of a phonograph needle.

A more specific object of this invention is to provide a system for measuring the distance a phonograph needle travels through a groove of a phonograph record.

A further object of this invention is to record the distance a phonograph needle travels through the grooves of all the reocrds played by the needle, to provide a continuous indication of the use the needle has had.

Another object of this invention is to provide a system for measuring the use of a phonograph needle which is automatically placed in operation upon starting the phonograph and is automatically stopped when the phonograph is stopped.

Another object of this invention is to provide a system for automatically indicating when the useful life of a particular phonograph needle has ended.

A still further object of this invention is to provide a system for measuring the distance traveled by a phonograph needle, which is simple in construction, may be economically manufactured, and which will have a long service life.

Other objects and advantages of the invention will be evident from the following detailed description, when read in conjunction with the accompanying drawings which illustrate my invention.

Figure 1:
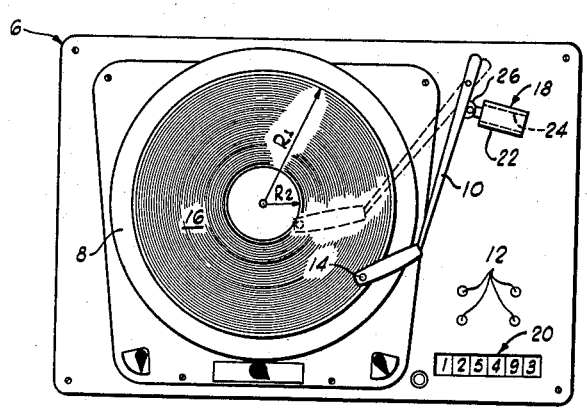
Figure 1 is a plan view of a phonograph having the present system incorporated therein.

Referring to the drawings in detail, and particularly Fig. 1, reference character 6 generally designates a typical phonograph which has a turntable 8 and a needle-carrying arm 10. The speed of operation of the turntable 8 may be controlled by any suitable means, such as by pushbuttons 12 interposed in a power and control circuit, as will be described, to provide the desired speed for the turntable. The usual needle 14 is suitably secured in the outer end of the arm 10 to ride in the groove of a phonograph record 16 being rotated by the turntable 8.

In the operation of the phonograph 6, the turntable 8 is moved at a constant speed of rotation as the needle 14 is moved from the outer edge of the record 16 to the inner portion of the record, such as from radius $R_1$ to radius $R_2$. It will be observed, therefore, that the needle 14 travels (relative to the record 16) a greater distance during each turn of the record 16 when positioned at radius $R_1$ than when positioned at radius $R_2$. Therefore, the position of the arm 10 at any particular portion of the record playing operation is indicative of the relative speed of the needle 14 in the groove of the record 16.

Figure 2:
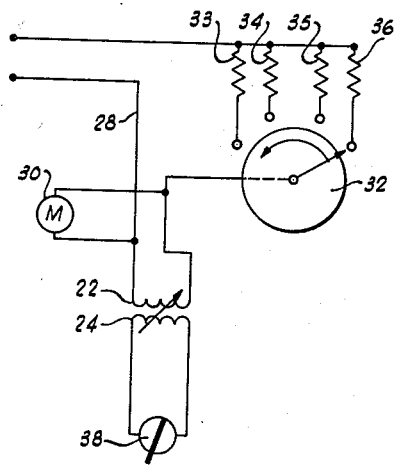
Figure 2 is a wiring diagram of a typical phonograph turntable control circuit having the present system connected thereto.

In accordance with the present invention, a control device, generally designated by reference character 18, is attached to the arm 10 to control the power fed to a suitable recording means 20 in accordance with the speed of rotation of the turntable 8 and the positions of the arm 10 when the needle 14 is being moved through the groove of the record 16. The control means 18 may take any of several different forms. For example, the control means 18 may be a variable inductance transformer comprising a stationary coil 22 fixed to the frame of the phonograph 6 and a movable coil 24 attached by a bracket 26 to the arm 10. The coils 22 and 24 may take any desired configuration, such as a telescoping form as indicated in Fig. 1, such that the coils will form and provide a variable inductance transformer, with the position of the movable coil 24 relative to the fixed coil 22 controlling the inductive coupling of the coils. A typical wiring diagram for the embodiment shown in Fig. 1 is illustrated in Fig. 2.

The fixed coil 22 is connected to the turntable power and control circuit 28 in parallel with the turntable drive motor 30, such that the current flowing through the coil 22 will be proportional to the current driving the motor 30. Most present day phonographs have four different speeds, such as 16⅔ r.p.m., 33⅓ r.p.m., 45 r.p.m. and 78 r.p.m. These various speeds are obtained by the use of resistors in the control circuit 28. A typical circuit construction is with the resistors in parallel arranged to cooperate with a rotary type switch 32 as shown in Fig. 2, or push buttons 12 as shown in Fig. 1. These parallel resistors 33, 34, 35 and 36 are progressively increased in size, such that the current being fed to the motor 30 will depend upon the position of the switch 32. It will be apparent that the higher the resistance in the circuit 28, the smaller will be the current being fed to the motor 30, and the less will be the speed of the motor 30. For example, the resistor 36 may be the largest of the group, such that when the switch 32 is turned into series connection with the resistor 36, as shown in Fig. 2, the motor 30 will be operated to drive the turntable 8 at a speed of 16⅔ r.p.m. The resistor 33 will then be the smallest to provide a speed of 78 r.p.m. for the turntable 8 when the switch 32 is turned into series connection with the resistor 33.

Although it is preferred that the fixed coil 22 be interposed in the phonograph power and control circuit 28, it should be understood that the coil 22 may be energized in any suitable manner as long as it is energized with a current proportional to the speed of the turntable 8.

The movable coil 24 is connected in series with a motor 38 which drives the recorder 20. Therefore, the current induced in the movable coil 24 will be proportional, not only to the current fed to the turntable drive motor 30, but also proportional to the position of the needle-carrying arm 10, such that the current induced in the movable coil 24 is proportional to the actual relative linear speed of the needle 14 in the groove of the record 16 throughout operation of the phonograph.

Figure 3:
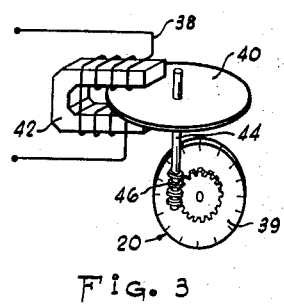
Figure 3 is a schematic perspective view of a typical distance recording device which may be used in the present system.

The indicator of the recorder 20 may take any desired form, such as an accumulator of the automobile mileage recording type, as illustrated in Fig. 1, or a suitable dial 39 as illustrated in Fig. 3. When a dial type of recorder is used, the motor 38 may be any simple electric motor, such as the type used in watt-hour meters having a circular plate 40 turned through a horseshoe magnet 42 which is in turn magnetized by the current induced in the movable coil 24 of the control means 18. The plate 40 has a suitable shaft 44 connected thereto for rotation in accordance with the amount of current being induced in the movable coil 24. The rotation of the shaft 44 is transmitted through suitable gearing 46 to turn the dial 39 at any desired speed, depending upon the amount of current being fed to the motor 38 and the calibration of the dial 39. Normally, the dial type of recorder will be driven at an extremely slow speed, such that the dial will not be turned more than once during the specified life of a needle 14.

In operation of the system illustrated in Figs. 1, 2 and 3, the operator merely places the record 16 on the turntable 8 in the usual fashion and starts the turntable motor 30 by pushing the appropriate button 12 or setting the rotary switch 32 to obtain the desired speed of rotation of the record 16. The arm 10 is then adjusted to place the needle 14 on the record 16 at the desired point. It may be noted here that the present system will operate effectively, regardless of whether the needle 14 is placed near the outer edge of the record 16 or at some intermediate point on the record 16.

When the turntable drive motor is energized, a similar current is directed through the stationary coil 22 to induce a current in the movable coil 24 proportional to the current fed to the motor 30, and hence proportional to the speed of rotation of the turntable 8. Also, the current induced in the movable coil 24 will depend upon the position of the coil 24 with respect to the coil 22. Normally, coils 22 and 24 will be arranged such that the maximum inductive coupling between the coils is obtained when the arm 10 is positioned as indicated in full lines in Fig. 1, with the needle 14 placed at the outer edge of the record 16. In this position of the arm 10, the maximum current will be induced in the movable coil 24 for the respective speed of rotation of the turntable 8, to drive the recorder motor 38 at its maximum speed.

As the arm 10 is moved toward the dashed line position shown in Fig. 1 to move the needle 14 toward the center of the record 16, the coil 24 will be progressively moved away from the coil 22. Therefore, the inductive coupling between the coils 22 and 24 will be progressively decreased to decrease the current induced in the coil 24 in accordance with the positions of the arm 10. It will therefore be apparent that the power supplied to the recorder 20 will be in proportion with the rotary speed of the turntable 8 and the position of the needle 14 on the record 16, such that the distance indicated by the recorder 20 will be proportional to the actual distance the needle 14 has moved through the groove of the record 16. It will be understood that the recorder 20 may be calibrated in any desired units of linear measurement, such as feet or yards. Furthermore, the distance the needle 14 moves through the grooves of records successively played on the phonograph 6 will be accumulated on the recorder 20 to indicate the total use of the needle.

Insofar as the present system is concerned, the operator of the phonograph 6 merely needs to note the reading on the recorder 20 when replacing the needle 14. When the recommended use of the new needle 14 has been added on the recorder 20, the needle is again replaced. For example, assume that the recommended use of the needle 14 is 200 units of measurement by the particular recorder 20. Each time the recorder 20 indicates an additional 200 units of measurement, the needle 14 is replaced.

Figure 4:
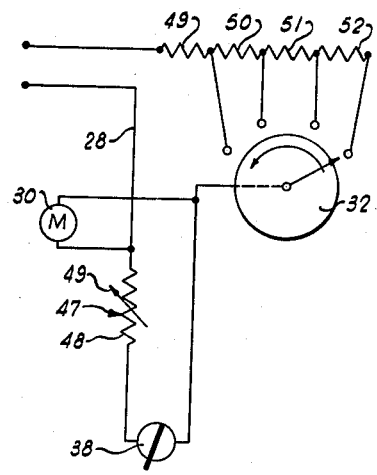
Figure 4 is a view similar to Fig. 2 illustrating a modified construction.

As previously indicated, the control means 18 which controls the power supplied to the recorder 20 may take various other forms, such as a variable resistance resistor 47 as illustrated in Fig. 4. The coil 48 of the resistor 47 is connected in parallel with the turntable drive motor 30, and the brush 49 of the resistor 47 is connected (not shown) to the arm 10 of the phonograph 6. Therefore, the position of the brush 49 on the coil 48 of the resistor 47 will depend upon the position of the arm 10, to control the current flowing through the resistor 47 in substantially the same manner as the variable inductance transformer previously described. In other words, the current flowing to the recorder motor 38 connected in series with the resistor 47 will be proportional, not only to the current used for driving the turntable 8, but also to the position of the arm 10, to provide a current proportional to the actual linear speed of the needle 14. The brush carried by the arm 10 will be arranged with respect to the coil of the resistor 47, such that the resistance of the resistor 47 will be increased as the needle 14 moves toward the center of the record 16 to progressively decrease the current supplied to the motor 38.

The control means 18 may also take the form of a variable capacitance in a suitable circuit involving an electronic tube or the like (not shown). It is well known in radio and electronic circuits that a varying capacity (variable condenser) in the grid circuit—or a varying resistance in the filament circuit—will vary the current flowing from the filament to the plate of an electron tube. The arm 10 could carry one plate or set of plates forming one side of the variable condenser, moving relative to the other plate or set of plates fixed to the frame of the phonograph 6, such that as the arm 10 moves inward, the varying capacity in the circuit cuts down the response current flowing through the tube and driving the motor 38 of the recorder 20.

As also illustrated in Fig. 4, the turntable control circuit 28 may have a group of resistors 49, 50, 51 and 52 connected in series, rather than the parallel resistors 33—36 shown in Fig. 2. It will be apparent that these series connected resistors 49-52 may be used in conjunction with a rotary switch 32 to vary the current supplied to the turntable drive motor 39, and hence control the speed of rotation of the turntable 8. As the switch 32 shown in Fig. 4 is turned counterclockwise from the position shown, the resistance in the circuit 28 is reduced to increase the current fed to the motor 30 and increase the speed of the turntable 8.

Figure 5:
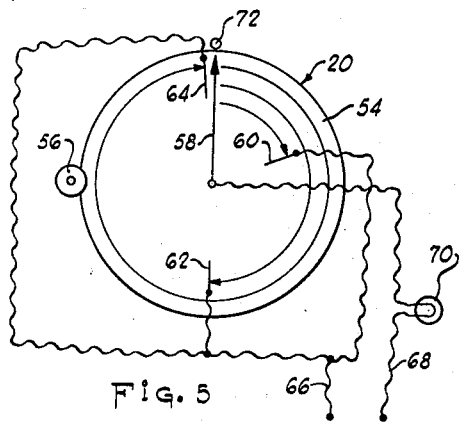
Figure 5 is a schematic plan view of one type of recording dial which may be used in the present system.

When a dial type of recorder 20 is used, the dial may be constructed as illustrated in Fig. 5 to provide a visual indication that the useful life of any desired type of needle has expired. In this construction, the dial 54 is normally fixed in position by a suitable set screw 56, and a pointer 58 is moved over the face of the dial 54 by a suitable drive motor, such as the motor 38 shown in Fig. 3. In one embodiment, a series of three stops 60, 62 and 64 are provided on the face of the dial 54 in the path of movement of the pointer 58. Each of the stops 60, 62 and 64 is connected by a suitable lead line to a common conductor 66. Another conductor 68 is connected to the pointer 58 to form a circuit with the conductor 66 as will be described. A suitable light 70 is also preferably interposed in the conductor 68.

In operation of the recorder illustrated in Fig. 5, the dial 54 is turned manually until the pointer 58 registers with the zero point 72 indicated on the dial, and then the set screw 56 is tightened to hold the dial 54 in the desired position. As the phonograph needle is used, the pointer 58 is turned (clockwise as shown in Fig. 5) in accordance with the actual distance the needle is moved through the grooves of the phonograph records. The dial 54 may be easily calibrated such that the stops 60, 62 and 64 are located at points where the pointer 58 should be when various types of needles are used up. For example, the stop 60 may be located at a distance from zero marking 72 equivalent to the distance the pointer 58 should move during the useful life of a steel phonograph needle. When the pointer 58 has been turned into contact with the stop 60, the circuit through the conductors 66 and 68 will be closed to energize the light 70 and indicate to the operator that the steel needle should be changed. In this type of construction, the stops 62 and 64 may be positioned for sapphire and diamond phonograph needles, respectively, such that the operator will be advised when the particular type of needle being used should be changed. It will be understood that any of the stops 60, 62 or 64 may be removable or constructed in any desired manner, such that the stop associated only with the type of needle being used will be effective in completing the circuit through the conductors 66 and 68.

From the foregoing it will be apparent that the present invention will minimize the damage to phonograph records through use of faulty or worn phonograph needles. The present system indicates and records the actual distance traveled by a phonograph needle to provide a true measure of the wear incurred through use of the needle. The present system operates automatically when a phonograph is started and stopped, such that the operator will perform only the usual functions when playing a phonograph incorporating this invention. Furthermore, the present system is simple in construction, will have a long service life and may be economically manufactured.

Changes may be made in the combination and arrangement of parts or elements as heretofore set forth in the specification and shown in the drawings, it being understood that changes may be made in the precise embodiments disclosed without departing from the spirit and scope of the invention as defined in the following claims.

I claim:

1. In combination with a phonograph having a needle-carrying arm, a system for measuring the distance the needle travels through the groove of a record being played by the phonograph, an electrically driven distance recording means, power supply means for the distance recording means, and speed control means in said power supply means connected to the needle-carrying arm for controlling the operation of the distance recording means in accordance with the positions of the needle-carrying arm.

2. The combination defined in claim 1 characterized further in that said speed control means comprises a variable inductance transformer.

3. The combination defined in claim 1 characterized further in that said speed control means comprises a variable resistance.

4. In combination with a phonograph having an electrical turntable control circuit and a needle-carrying arm, a system for measuring the distance a needle carried by the arm travels through the grooves of records played by the phonograph, comprising electrically driven distance recording means, current conducting means connecting the distance recording means to the turntable control circuit for driving the distance recording means at a speed proportional to the amount of current flowing through the turntable control circuit, and current control means interposed in said current conducting means and connected to the needle-carrying arm for controlling the speed of the distance recording means in accordance with the positions of the needle-carrying arm.

5. The combination defined in claim 4 characterized further in that said current control means comprises a variable inductance transformer having a fixed coil and a movable coil, one of said coils being interposed in the turntable control circuit, the other of said coils being interposed in said current conducting means, and a linkage connecting the movable coil to the needle-carrying arm.

6. The combination defined in claim 4 characterized further in that said current control means comprises a variable resistance having a coil and a movable brush contacting the coil, said coil being interposed in said current conducting means and said brush being connected to the needle-carrying arm.

References Cited in the file of this patent

UNITED STATES PATENTS

| | | |
|---|---|---|
| 1,585,660 | Frampton | May 25, 1926 |
| 2,262,131 | Beizer | Nov. 11, 1941 |